United States Patent [19]

Takemori et al.

[11] Patent Number: 5,075,373
[45] Date of Patent: Dec. 24, 1991

[54] WATER RETENTION MATERIAL WITH WATER-ABSORBENCY

[75] Inventors: Shinichi Takemori; Shigeji Obayashi, both of Hyogo; Morio Nakamura, Himeji; Kosaku Yamada; Tetsurou Motooka, both of Hyogo, all of Japan

[73] Assignee: Seitetsu Kagaku Co., Ltd., Hyogo, Japan

[21] Appl. No.: 302,966

[22] Filed: Jan. 30, 1989

[30] Foreign Application Priority Data

Mar. 31, 1988 [JP] Japan .................................. 63-80746

[51] Int. Cl.$^5$ .............................................. C08L 29/04
[52] U.S. Cl. .......................................... 525/57; 525/58
[58] Field of Search .................................... 525/57, 58

[56] References Cited

U.S. PATENT DOCUMENTS

| 3,966,679 | 6/1976 | Gross | 523/111 |
| 4,041,228 | 8/1977 | Gross | 525/385 |
| 4,200,558 | 4/1980 | Holst et al. | 524/44 |
| 4,590,227 | 5/1986 | Nakamura et al. | 524/44 |

Primary Examiner—John C. Bleutge
Assistant Examiner—Thomas Hamilton, III

[57] ABSTRACT

A water retention material with water-absorbency which comprises finely divided particles of water-absorbent resin having a water absorption capacity of 2 to 50-fold and a particle size of 100µ or finer and a hydrophobic material such as a thermoplastic resin, elastomer, sealant, paint or adhesive.

2 Claims, No Drawings

WATER RETENTION MATERIAL WITH WATER-ABSORBENCY

FIELD OF THE INVENTION

The present invention relates to an improved water retention material with water-absorbency. More specifically, the water retention material of the present invention comprises finely divided water-absorbent resin particles whose water adsorption capacity has been adjusted to such a low capacity as 2 to 50-fold, and an hydrophobic material such as a thermoplastic resin, an elastomer, a sealant, a paint or an adhesive and, if necessary, it is molded into a desired shape. The water retention material of the present invention can be widely used in various fields, for example, as waterstopping materials for civil engineering and construction industry, caulking materials, dew condensation-proof materials, water-swelling paints, water-swelling adhesives, horticultural materials, toy materials, utensils and the like.

BACKGROUND OF THE INVENTION

In order to use hydrophobic materials such as thermoplastic resins, elastomers, sealants, paints, adhesives and the like in various fields, it has been requested to provide these materials with both water-absorbency and water retention properties. As methods for providing these materials with water-absorbency, hitherto, various proposals have been made and there are known, for example, a method for enhancing hydrophilic properties by chemically treating the surface of a hydrophobic material and a method for blending a water-absorbent substance with a hydrophobic material. Among them, since the method using a water-absorbent substance can be relatively readily carried out and high water-absorbency can be obtained, many investigations thereof have been done. Particularly, the method using water-absorbent resin particles has widely been employed in practice.

However, there is a problem that a water-absorbent resin has a high water absorption capacity and, therefore, the resin particles on the surface of a hydrophobic material readily absorb water and swell to cause removal thereof from the surface of the hydrophobic material due to falling off of the swollen particles, which results in a rough surface of the material. And, in the extreme case, falling off of the resin particles gradually extends to the inside of the material and, sometimes, water-absorbency of the hydrophobic material is completely lost. In order to solve such a problem, Japanese Patent Kokai No. 56-33032 discloses a method comprising dispersing finely divided particles of a water-absorbent resin having a particle size of 100μ or finer in a flexible resin or rubber uniformly. However, it is insufficient to solve the above problem and, when the product is soaked in a water for a long period of time, falling off of the water-absorbent resin particles is excessive.

In Japanese Patent Kokai No. 62-174259, a silicone rubber is provided with water-absorbency by using a water-absorbent resin and, in order to avoid the problem of falling off of the water-absorbent resin, a specific kind of silicone rubber is chosen.

Japanese Patent Kokai No. 61-200142 discloses the use of an ethylene-acrylic acid copolymer. However, there is no disclosure about the above problem of falling off of the water-absorbent resin particles at all.

Under these circumstances, the present inventors have studied intensively to solve the above problem. As the result, it has been found that a water absorption capacity of the water-absorbent resin itself has great influence on this falling off phenomenon upon absorption of water and the surface appearance of the above hydrophobic materials. That is, it has been found that, in general, as a water absorption capacity of a water-absorbent resin becomes higher, an amount of the water-absorbent resin removed from a hydrophobic material due to falling off becomes larger and, in the case of soaking the material in water for a long period of time, the amount of the resin removed becomes excessive, which results in loss of water-absorbency and water retention properties.

Nevertheless, in each of the above conventional techniques, water-absorbent resins having a high capacities of several hundreds to 1000-fold are used as they are, and it has been considered that water-absorbent resins having low water absorption capacities are undesirable because of their inferior water-absorbency and water retention properties.

On the contrary, according to the present inventors, it has been found that a water retention material with water-absorbency having a good surface appearance with minimum removal of a water-absorbent resin upon absorption of water can be obtained by using a water-absorbent resin in which its water absorption capacity has been adjusted to such a low capacity as 2 to 50-fold.

In fact, even by using a water-absorbent resin having a low water absorption capacity, the resulting water retention material with water-absorbency sufficiently functions as waterstopping materials, caulking materials, dew condensation-proof materials and the like and, in practice, use of a water-absorbent resin having high water absorption capacity is not necessarily required.

On the contrary, it has been unexpectedly found that uniform dispersion of a water-absorbent resin in a hydrophobic material can be readily obtained by using a large amount of a water-absorbent resin having a low water absorption capacity rather than by using a small amount of that having a high water absorption capacity.

OBJECTS OF THE INVENTION

The main object of the present invention is to provide a water retention material with water-absorbency which comprises water-absorbent resin particles and a hydrophobic material such as a thermoplastic resin, an elastomer, a sealant, a paint, an adhesives or the like and has a good surface appearance without removal of the water-absorbent resin particles from the material due to falling off of swollen particles of the resin upon absorption of water.

This object as well as other objects and the advantages of the present invention will become apparent to those skilled in the art from the following description.

SUMMARY OF THE INVENTION

According to the first aspect of the present invention, there is provided a water retention material with water-absorbency which comprises finely divided particles of water-absorbent resin having a water absorption capacity of 2 to 50-fold and a particle size of 100μ or finer and a thermoplastic resin or elastomer.

The second aspect of the present invention is to provide a water retention material with water-absorbency comprises finely divided particles of water-absorbent resin having a water absorption capacity of 2 to 50-fold and a particle size of 100μ or finer and a hydrophobic sealant.

The third aspect of the present invention is to provide a water retention material with water-absorbency comprises finely divided particles of water-absorbent resin having a water absorption capacity of 2 to 50-fold and a particle size of 100μ or finer and a hydrophobic paint.

The fourth aspect of the present invention is to provide a water retention material with water-absorbency comprises finely divided particles of water-absorbent resin having a water absorption capacity of 2 to 50-fold and a particle size of 100μ or finer and a hydrophobic adhesive.

The fifth aspect of the present invention is to provide a method for providing a hydrophobic material with water retention properties and water-absorbency comprising mixing the hydrophobic material with finely divided particles of water-absorbent resin having a water absorption capacity of 2 to 50-fold and a particle size of 100μ or finer and, if necessary, molding the mixture.

The sixth aspect of the present invention is to provide a method for providing an elastomer with water retention properties and water-absorbency comprising mixing the elastomer with finely divided particles of water-absorbent resin having a particle size of 100μ or finer whose water absorption capacity is not adjusted, water and a cross linking agent and, if necessary, molding the mixture.

The water retention material with water-absorbency of the present invention has a good surface appearance without removal of the water-absorbent resin from the material due to falling off of swollen particles of the resin upon absorption of water. Therefore, it is suitable for using at a conspicuous place.

DETAILED DESCRIPTION OF THE INVENTION

The water-absorbent resin used in the present invention is not limited to a specific one and any commercially available resin can be used. Particularly, the resin containing a carboxylate as a constituent component of the polymer is advantageous because its water absorption capacity can be readily adjusted by crosslinking. Examples of the water-absorbent resin include crosslinked polyacrylic acid salts, crosslinked copolymers of vinyl alcohol and acrylic acid salt, crosslinked products of polyvinyl alcohol grafted with maleic anhydride, crosslinked copolymers of acrylic acid salt and methacrylic acid salt, crosslinked saponification products of methyl acrylate-vinyl aetate copolymer, crosslinked products of starch-acrylic acid salt graft copolymer, crosslinked saponification products of starch-acrylonitrile graft copolymer, crosslinked saponification products of starch-ethyl acrylate graft copolymer, crosslinked carboxymethyl cellulose and the like.

The term "water absorption capacity" used herein means the ratio of the weight gain of 1 g of the water-absorbent resin by absorption of water under the conditions as described in Examples hereinafter. The water-absorbent resin used in the present invention has a water absorption capacity of 2 to 50-fold. Many of presently available water-absorbent resins have water absorption capacities of several hundreds to 1000-fold and, as described above, it has been considered that the water-absorbent resin having a higher water absorption capacity is more preferable in order to provide with water-absorbency. Accordingly, in order to apply such water absorbent resin having high capacity in the present invention, their water absorption capacities should be adjusted to 2 to 50-fold.

For this purpose, it is preferred to subject the water-absorbent resin to a crosslinking reaction with a crosslinking agent having two or more functional groups in a somewhat swelling state in the presence of 10 to 200 parts by weight, preferably, 25 to 100 parts by weight of water per 100 parts by weight of the resin. When the amount of water is too small, the resin is not sufficiently swollen and, when the amount is too large, it is gelled. Therefore, the amount of water should be maintained in the above range. The crosslinking agent is used in an amount of 0.01 to 10 parts by weight, preferably, 0.1 to 5 parts by weight per 100 parts by weight of the water-absorbent resin. When the amount is too small, the resin is not sufficiently crosslinked and, when the amount is too large, any further advantage is scarcely expected and, therefore, it is uneconomical. Although, in the present assignee's Japanese Patent Kokai No. 58-117222 relating to a process for improving water-absorbency of a water-absorbent resin, there is described that a crosslinking agent is suitably used in an amount of 0.005 to 5.0% by weight in order to crosslink the surface layer of a water-absorbent resin, in the present invention, it is necessary to use a crosslinking agent in the larger amount as described above under the same conditions since the crosslinking reaction should be extended to somewhat inside of the resin.

The water absorption capacity can be also adjusted during the production steps of the water-absorbent resin. For example, the water-absorbent resin having a water absorption capacity of 2 to 50-fold can be obtained by carrying out a crosslinking reaction with a crosslinking agent in a suitable stage of polymerization of a monomer or after polymerization. For producing the water-absorbent resin containing a carboxylate, there can be employed a process disclosed in, for example, Japanese Patent Kokai No. 56-93716, Japanese Patent Kokai No. 56-131608, Japanese Patent Kokai No. 56-147806, Japanese Patent Kokai No. 53-50290, Japanese Patent kokai No. 53-46389, Japanese Patent kokai No. 55 108407, Japanese Patent Kokai No. 52-59690, U.S. Pat. No. 3,966,679, U.S. Pat. No. 4,041,228 or the like. The water-absorbent resin having the desired water absorption capacity can be obtained by carrying out a crosslinking reaction in the course of the above process with 0.01 to 10 parts by weight, preferably, 0.1 to 5 parts by weight of a crosslinking agent per 100 parts by weight of a monomer. The resulting water-absorbent resin can be immediately employed in the present invention as it is. The crosslinking conditions such as the stage of crosslinking, the kind and amount of a crosslinking agent, addition of water or without water, the amount of water and the like should be appropriately chosen according to a particular kind of the water-absorbent resin.

As the crosslinking agent, there can be used, for example, di- or tri (metha)acrylates (i.e., acrylates and methacrylates) of polyols such as ethylene glycol, propylene glycol, trimethylolpropane, glycerin, polyoxyethylene glycol, polyoxypropylene glycol, polyglycerin and the like; bisacrylamides such as N,N-methylenebisacrylamide and the like; N,N',N"-triacrylisocyanate; divinylbenzene; and the like. Further, there can be also used a crosslinking agent which utilizes reactivity to carboxyl group in an α,β-unsaturated carboxylic acid, an alkaline metal salt or a polymer thereof. Examples thereof include diglycidyl ether compounds, haloepoxy compounds, isocyanate compounds and the like. Among them, diglycidyl ether compounds are particularly suitable.

In any case, the water absorption capacity is adjusted to 2 to 50-fold, preferably, 10 to 30-fold by carrying out a suitable crosslinking reaction in the presence of a suitable amount of water according to a particular kind of the water-absorbent resin to be used.

The water-absorbent resin used in the present invention is in the form of finely divided particles. Such particles can be produced, for example, by pulverizing the water absorbent resin according to a conventional method. The particle size thereof should be on the average 100μ or finer, preferably, 40μ or finer. It is preferred that the average particle size is as small as possible since the resin can be readily dispersed in a hydrophobic material and removal of the water absorbent resin from the hydrophobic material upon absorption of water can be more effectively prevented.

In the first aspect of the present invention, the water retention material with water absorbency comprises the water absorbent resin and a thermoplastic resin or elastomer.

The thermoplastic resin used in the present invention is not limited so far as it can be uniformly mixed with the finely divided particles of the water-absorbent resin used and it can be appropriately chosen according to a particular use of the resulting water retention material. In general, examples of the thermoplastic resin include polyethylene, polypropylene ethylene-acrylic acid copolymers, ethylene-vinyl acetate copolymers, thermoplastic polyester, polyamide, polyvinyl chloride and the like. Among them, ethylene-vinyl acetate copolymers can be used in various fields because they are flexible and have good workability and good compatibility with the water-absorbent resin particles.

The elastomer used in the present invention is generally classified into natural rubbers and synthetic rubbers. As the synthetic rubbers, there can be used various known rubbers such as styrene-butadiene rubber, butadiene rubber, chloroprene rubber, acrylonitrile-butadiene rubber, butyl rubber, fluorine rubber, ethylene propylene rubber, chlorosulfonated polyethylene, silicone rubber, urethane rubber, polysulfide rubber, acryl rubber and the like. Among them, from the viewpoint of workability and economy, it is preferred to use stylene-butadiene rubber and natural rubbers.

Although the proportion of the thermoplastic resin or elastomer to the water-absorbent resin can be appropriately chosen according to a particular use of the resulting water retention material, in general, the water retention material of the first aspect contains 15 to 700 parts by weight, preferably, 50 to 500 parts by weight of the thermoplastic resin or 25 to 700 parts by weight, preferably, 50 to 500 parts by weight of the elastomer per 100 parts by weight of the water-absorbent resin having a water absorption capacity of 2 to 50-fold. When the amount of the water-absorbent resin is too large, molding properties becomes inferior and, when the amount thereof is too small, a water absorption rate of the water retention material is lowered. Usually, about 100 parts by weight of the thermoplastic resin or elastomer is used per 100 parts by weight of the water-absorbent resin.

In addition, the water retention material can also contain an appropriate amount of one or more additives such as plasticizing agents (e.g., dioctyl phthalate) stabilization agents, fillers, pigments, vulcanizing agents, vulcanization accelerators, expanding agents and the like according to a particular use of the material.

The production process of the water retention material of the first aspect is not limited to a specific one and the water retention material can be produced according to conventional blending, mixing and/or kneading techniques and, if necessary, it can be molded into the desired shape such as sheets, strings, rings, tubes, films and the like according to conventional techniques.

For example, the thermoplastic resin can be blended with the water-absorbent resin, desired additives with a ribbon blender, Henschel mixer or the like. If necessary, he mixture can be molded into the desired shape such as a tube, a film, a string or the like by extrusion molding or inflation method. Or, it can be molded in the shape of a sheet by using T-die.

The water retention material can also be used in the form of pellets obtained by cutting the resulting string or in the form of powder obtained by pulverizing the pellets. Further, it can be molded in a desired shape by compression molding, injection molding, vacuum molding, blow molding and the like. In the case of the elastomer, after addition of desired additives, the mixture is kneaded with an open roll mill, kneader, Banbury mixer or the like and, then, formed into a vulcanized sheet with a hot press.

Particularly, in the case of the elastomer, sometimes, the desired water retention material can be obtained by mixing and kneading the water-absorbent resin having a high water absorption capacity without adjustment of the capacity with the elastomer, a predetermined amount of water, a crosslinking agent and required additives. That is, during mixing and kneading, the water-absorbent resin is crosslinked to reduce to the desired water absorption capacity, which results in the same effect as that obtained by blending with the water-absorbent resin whose water absorption capacity has already been adjusted to 2-50 fold and the elastomer. This may be advantageous because the water-absorbent resin can be readily and uniformly blended and some production steps can be omitted. Further, the water retention material obtained by adding a foaming agent during blending the elastomer with the water-absorbent resin and molded in a spongy form has an increased water absorption rate and improved elasticity and cushioning properties and it is advantageous for some uses. Furthermore, in order to use the water retention material by coating, spreading or the like, an appropriate amount. e.g., 5 to 95 % by weight of the resulting water retention material can be dissolved or dispersed in a solvent. This is also included in the water retention material of the present invention. The solvent to be used is not limited to a specific one and there can be used any conventional organic solvent such as aliphatic hydrocarbons, aromatic hydrocarbons, alicyclic hydrocarbons, halogenated hydrocarbons, alcohols, ketones and the like.

The water retention material of the second aspect of the present invention comprises the above water-absorbent resin and a hydrophobic sealant. That is, this water retention material is a sealant and the above water-absorbent resin is incorporated into a hydrophobic sealant as an ingredient thereof.

The sealant to be admixed with the water-absorbent resin in the present invention is not limited to a specific one and it may be a conventional and commercially available hydrophobic sealing material which is mainly used for construction industry to provide various kinds of joints and gaps (masonry joints) with watertight and hermetic properties by filling in or fitting to the joint parts as well as to fix glass and the like. It is generally classified into an elastic type and a non-elastic type. In the present invention, the elastic type is mainly used. Particularly, a one component non-solvent or solvent type sealant is preferred. Examples of a one-component non-solvent type sealant include silicone sealants (organopolysiloxane), modified silicone sealants, polysulfide sealants and polyurethane sealants. Examples of a one-component solvent type sealant include silicone sealants and butyl rubber sealants. In addition, there are two-component type sealants and they can be also used in the present invention. Examples thereof include silicone sealants, modified silicone sealants, polysulfide sealants, polyurethane sealants and acrylurethane sealants.

In the case of a solvent type sealant, the solvent is not limited to a specific one and there can be used any conventional organic solvent in which the other ingredients of the sealant can be uniformly dissolved or dispersed, for example, aliphatic hydrocarbons, aromatic hydrocarbons, alicyclic hydrocarbons, halogenated hydrocarbons, alcohols, ketones. Specific examples of the solvent include n-propyl alcohol, i-propyl alcohol, n-butyl alcohol, i-butyl alcohol, t-butyl alcohol, amyl alcohol, octyl alcohol, ethylene glycol, propylene glycol, glycerin, diethylene glycol, acetone, methyl ethyl ketone, methyl isobutyl ketone, n-pentane, n-hexane, n-heptane, ligroin, benzene, toluene, xylene, chlorobenzene, cyclopentane, methylcyclopentane, cyclohexane, methylcyclohexane, carbon tetrachloride, methylene chloride, chloroform, ethylene dichloride, trichloroethylene, tetrahydrofuran and the like. They can be used alone or in combination thereof. From the industrial viewpoint, n-hexane, n-heptane, toluene, xylene and trichloroethylene are advantageous.

Although the proportion of the sealant to the water-absorbent resin can be appropriately chosen according to a particular use of the resulting water retention material, in general, the water retention material of the second aspect contains 50 to 2000 parts by weight, preferably, 100 to 1000 parts by weight of the sealant per 100 parts by weight of the water-absorbent resin having a water absorption capacity of 2 to 50-fold. When the amount of the water-absorbent resin is too small, water-absorbency become insufficient and, when the amount thereof is too large, fluidity of the sealant is impaired.

In the case of a one-component sealant, usually, it is a moisture curing type liquid product filled in a container such as a tube, a cartridge or the like and it is cured by bringing it contact with moisture in air. Then, when the water-absorbent resin contains a large amount of moisture, the sealant is cured in the container and it become impossible to take out the sealant from the container. On the other hand, commercially available water-absorbent resin contains up to about 7% by weight of water, usually, about 6% by weight. Therefore, in order to avoid such a problem, the water content of the water-absorbent resin should be reduced to 4% by weight or lower, preferably, not more than 2% by drying the water-absorbent resin. This drying can be carried out by heating at a temperature which does not adversely affect properties of the product, or at a low temperature under vacuum. Of course, in the case of the other water retention material of the present invention, it is also preferred that the water content of the water-absorbent resin used should be as small as possible because it affects the water absorption capacity. Therefore, it is preferred to use such a dried water-absorbent resin to admix with the other ingredients.

A two-component type sealant is cured by admixing with a curing agent and, therefore, the water-absorbent resin can be incorporated into the main component of the two-component type sealant.

The production process for the water retention material of the second aspect is not limited to a specific one and the water retention material can be produced by incorporating the water-absorbent resin with an appropriate amount of one or more additives such as plasticizing agents (e.g. silicone oil), crosslinking agents and the like into conventional sealant ingredients according to conventional blending, mixing, kneading, dissolving and/or dispersing techniques.

For example, a liquid product can be produced by mixing the ingredients with a conventional mechanical stirring apparatus such as kneader, planetary mixer, drum rotating mixer, drill type-mixer, ball mill, paint shaker or the like. In the case of the moisture curing one-component type sealant, it is necessary to exclude moisture. Further, in the case of the solvent type sealant, it is necessary to prevent volatilization of the organic solvent. In any case, a closed stirring mixer is employed. If necessary, it is sealed with an inert gas such as nitrogen gas or the like.

The water retention material of the third aspect of the present invention comprises the above water-absorbent resin and a hydrophobic paint. That is, this water retention material is a paint and the above water-absorbent resin is incorporated into a hydrophobic paint as an ingredient thereof.

The paint to be admixed with the water-absorbent resin is not limited to a specific one and any commercially available hydrophobic paint, for example, chlorosulfonated polyethylene paint or the like can be used. Such a paint can contain an organic solvent as described with respect to the above sealant.

Although the proportion of the paint to the water-absorbent resin can be appropriately chosen according to a particular use of the resulting water retention material, in general, the water retention material contains 100 to 10000 parts by weight per 100 parts by weight of the water-absorbent resin having a water absorption capacity of 2 to 50-fold. When the amount of the water-absorbent resin is too small, it is difficult to provide water-absorbency and, when the amount thereof is too large, adhesion of the paint to the base is lowered and the water-absorbent resin is removed.

The production process of the water retention material of the third aspect is not limited to a specific one and the water retention material can be produced according to the similar manner as described with respect to the above sealant.

The water retention material of the fourth aspect of the present invention comprises the above water-absorbent resin and a hydrophobic adhesive. That is, this water retention material is an adhesive and the above water-absorbent resin is incorporated into a hydrophobic adhesive as an ingredient thereof.

The adhesive to be admixed with the water-absorbent resin is not limited to a specific one and any commercially available hydrophobic adhesive, for example, chloroprene adhesive or the like can be used. Such an adhesive can contain an organic solvent as described with respect to the above sealant.

Although the proportion of the adhesive to the water-absorbent resin can be appropriately chosen according to a particular use of the resulting water retention material, in general, the water retention material contains 100 to 10000 parts by weight per 100 parts by weight of the water-absorbent resin having a water absorption capacity of 2 to 50-fold. When the amount of the water-absorbent resin is too small, it is difficult to provide water-absorbency and, when the amount thereof is too large, adhesion is lowered and the water-absorbent resin is removed.

The production process of the water retention material of the fourth aspect is not limited to a specific one and the water retention material can be produced according to the similar manner as described with respect to the above sealant.

The method of the present invention can be carried out admixing the water-absorbent resin with the desired hydrophobic material as described herein above.

According to the present invention, various kinds of hydrophobic materials can be provided with water-absorbency and removal of the water-absorbent resin from the material can be prevented effectively. Therefore, improved water-absorbency can be maintained for a long period of time. Further, the water retention material of the present invention has a good surface appearance and, therefore, it can be widely used as follows:

(1) Thermoplastic resin or elastomer (Molding article) waterstopping materials and caulking materials for civil engineering and construction industry which fill in cracks, gaps and the like in concrete or mortar applied places or joints of water pipes; waterstopping materials for cars; water retention materials for horticulture; swelling toys; dehydrating agents for separation of water and oils and the like.

(Film, sheet) packaging media for storing fresh vegetables, fresh fish and the like; sheets for germination of seeds and seedling culture; dew condensation-proof materials and the like.

(2) Sealant masonry joint-filling materials for civil engineering and construction industry, caulking materials, waterstopping materials, joint-sealing materials, soil release of sealing rubbers and the like.

(3) Paint leakage controlling of steel sheet piles, dew condensation-proof materials and the like.

(4) Adhesive adhesion between elastomeric waterstopping materials and cement products, metals and the like.

The following Preparations, Examples and Comparative Examples further illustrate the present invention in detail but are not to be construed to limit the scope thereof. All %'s and parts are by weight unless otherwise stated.

Water absorbency in Examples and Comparative Examples is determined as follows:

(1) Water absorption capacity (g/g or -fold)

A water-absorbent resin (1.0 g) is dispersed in water (ion exchanged water) and stirred. After 4 hours, the resulting gel is filtered through a 200 mesh metallic wire gauze and the weight of the gel obtained as a filter cake is measured and the value is taken as the water absorption capacity.

(2) Water absorption rate (%)

A water retention material with water-absorbency is formed in a rectangular specimen (20×40 mm having 1, 2 or 4 mm in thickness) and the specimen is soaked in ion exchanged water (500 ml). After a predetermined time, the weight thereof is measured and the water absorption rate is calculated by the following equation.

$$\text{Water absorption rate (\%)} = \frac{(W - W_0)}{W_0} \times 100$$

$W_0$: the weight before water absorption (g)
$W$: the weight after water absorption (g)

(3) Removal ratio (%)

The above mentioned specimen is soaked in ion exchanged water (500 ml) for a predetermined time. After taking out the swollen sheet, the soaking solution is evaporated to dryness and then the amount of the residue is measured and the ratio of the removed resin is calculated by the following equation.

$$\text{Removal ratio (\%)} = \frac{\text{Amount of residue (g)}}{\text{Weight of water retention material (g)}} \times 100$$

(4) Surface appearance

The surface appearance of the swollen sheet is visually evaluated according to the following criteria.
A: smooth surface
B: slightly rough surface
C: rough surface Preparation 1

Crosslinked polyacrylic acid salt having the water absorption capacity of 300 g/g (manufactured and sold by SEITETSU KAGAKU Co., Ltd., Japan, under the trade name of AQUA KEEP 4S) (5,000 g) was placed in 20 liter-Henschel mixer. Then, ion exchanged water (2,500 g) and ethylene glycol diglycidyl ether (25 g) was added dropwise with stirring and mixed. After the mixture was taken out of the mixer, it was dried in an oven with internal air circulation (110° C.) for 16 hours to advance the crosslinking reaction. The resulting product had the water absorption capacity of 25 g/g. The water content of the product (measured by drying in a perfect oven at 140° C. for 4 hrs.) was 2.0%. It was pulverized and screened to obtain the water-absorbent resin particles having an average particle size of 100μ or finer.

Preparation 2

Acrylic acid having the purity of 99.8% (39.1 g) was placed in a 100 ml-flask equipped with a stirrer and 23.3% aqueous sodium hydroxide solution (69.9 g) was added dropwise with cooling to neutralize 75% of the acrylic acid. To the mixture was added potassium persulfate (0.13 g) and was dissolved at room temperature with stirring. To a 500 ml-flask equipped with a reflux condenser and purged with nitrogen gas were placed cyclohexane (213.6 g) and sorbitol monostearate (1.1 g) and dissolved at 50 to 55° C. with stirring. After cooling to room temperature, the above partially neutralized acrylic acid solution was added dropwise and ethylene glycol diglycidyl ether (2.4 g) was added to form a suspension. The suspension was subjected to polymerization reaction for 6 hours with maintaining at 50° C. and then evaporated to dryness on an oil bath 110° C. Then, the product was pulverized and screened to obtain finely divided water-absorbent resin having water absorption capacity of 35.5 g/g and average particle size of 100μ or finer.

Preparation 3

Crosslinked polyacrylic acid salt having the water absorption capacity of 720 g/g (manufactured and sold by SEITETSU KAGAKU Co., Ltd., Japan, under the trade name of AQUA KEEP 10SH) (200 g) was placed in 1 liter-kneader. Then, ion exchanged water (100 g) and ethylene glycol diglycidyl ether (1.0 g) was added dropwise with stirring and mixed. After the mixture was taken out of the kneader, it was dried in an oven with internal air circulation (110° C.) for 16 hours to advance the crosslinking reaction. The resulting particles were screened to obtain the water-absorbent resin particles having the water absorption capacity of 45 g/g and average particle size of 100μ or finer.

Preparation 4

According to the same manner as described in Preparation 1, water-absorbent resin particles having average particle size of 100μ or finer were obtained except that the amount of ethylene glycol diglycidyl ether and the kind of the resin was changed as shown in Table 1. Water-absorbency of the resulting water-absorbent resin is shown in Table 1.

copolymer (100 parts) manufactured and sold by SEITETSU KAGAKU Co., Ltd., Japan, under the trade name of Flo-Vac K2010), polyethylene oxide (10 parts) (manufactured by SEITETSU KAGAKU Co., Ltd., Japan, under the trade name of PEO-8), polyethylene glycol #400 (10 parts) and stearic acid (2 parts) by using a mixer. The mixture was kneaded with 6 inch open roll mill (80° C. × 10 minutes) and subjected to hot pressing (140° C. × 10 minutes) to obtain the desired water retention material in the form of a sheet having the thickness of 1 mm.

EXAMPLES 2 TO 6

The water-absorbent resin (100 parts by weight) obtained in Preparations 2 to 4 were mixed, kneaded and subjected to hot pressing according to the same manner as described in Example 1, respectively to obtain the desired water retention material in the form of a sheet having the thickness of 1 mm.

COMPARATIVE EXAMPLES 1 TO 5

A sheet having a thickness of 1 mm was prepared according to the same manner as described in Example 1 except that the commercially available water-absorbent resin (100 parts by weight) used in Preparation 1, 3 or 4 was used as it was.

TABLE 1

| Sample No. | Amount of ethylene glycol diglycidyl ether (g/g) | Water-absorbent resin | Water absorption capacity (g/g) |
| --- | --- | --- | --- |
| 4-1 | 50 | crosslinked polyacrylic acid salt AQUA KEEP 4S (manufactured by SEITETSU KAGAKU Co., Ltd., Japan) | 15 |
| 4-2 | 250 | crosslinked polyacrylic acid salt AQUA KEEP 4S (manufactured by SEITETSU KAGAKU Co., Ltd., Japan) | 5 |
| 4-3 | 50 | saponification product of starch-acrylonitrile graft copolymer SAN WET (manufactured by SANYO Chemical Industries Co., Ltd., Japan) | 35 |
| 4-4 | 50 | crosslinked copolymer of vinyl alcohol-acrylic acid salt SUMIKA GEL (manufactured by SUMITOMO Chemical Co., Ltd., Japan) | 40 |
| 4-5 | 50 | crosslinked polyacrylic acid salt AQUALIC CA (manufactured by NIPPON SHOKUBAI KAGAKU Kogyo Co., Ltd., Japan) | 30 |

EXAMPLE 1

The water-absorbent resin (100 parts) obtained in Preparation 1 was mixed with ethylene-vinyl acetate Water-absorbency of each sheet obtained in Examples 1 to 8 and Comparative Examples 1 to 5 is shown in Table 2.

TABLE 2

| | water-absorbent resin | | Water retention material with water-absorbency | | |
| --- | --- | --- | --- | --- | --- |
| Ex. No. | | Water absorption capacity (g/g) | Water absorption rate (%, 48 hrs.) | Removal ratio (%, 48 hrs.) | Surface appearance (after 48 hrs soaking) |
| Ex. 1 | Prep. 1 | 25 | 550 | <1 | A |
| Ex. 2 | Prep. 2 | 35 | 570 | " | A |
| Ex. 3 | Prep. 3 | 40 | 540 | " | A |
| Ex. 4 | Prep. 4-1 | 15 | 450 | " | A |
| Ex. 5 | Prep. 4-2 | 5 | 320 | " | A |
| Ex. 6 | Prep. 4-3 | 35 | 330 | " | A |
| Ex. 7 | Prep. 4-4 | 40 | 300 | " | A |
| Ex. 8 | Prep. 4-5 | 30 | 350 | " | A |
| Comp. Ex. 1 | AQUA KEEP 4S | 300 | 500 | 15 | B |
| Comp. Ex. 2 | AQUA KEEP 10SH | 720 | 450 | 25 | B |
| Comp. Ex. 3 | SAN WET PA-200 | 300 | 250 | 30 | C |
| Comp. Ex. 4 | SUMIKA GEL S-50 | 500 | 200 | 30 | B |
| Comp. Ex. 5 | AQUALIC CR | 250 | 250 | 27 | B |

TABLE 2-continued

| | water-absorbent resin | Water retention material with water-absorbency | | |
|---|---|---|---|---|
| Ex. No. | Water absorption capacity (g/g) | Water absorption rate (%, 48 hrs.) | Removal ratio (%, 48 hrs.) | Surface appearance (after 48 hrs soaking) |
| Ex. 5 | | | | |

EXAMPLE 9

The water-absorbent resin (100 parts) obtained in Preparation 1 was mixed with ethylene-acrylic acid copolymer (100 parts) (manufactured and sold by MITSUBISHI PETROCHEMICAL Co., Ltd., Japan, under the trade name of YUKALON EAA), polyethylene oxide, PEO-8 (10 parts), polyethylene glycol #400 (10 parts) and stearic acid (2 parts) by using Henschel mixer. The mixture was kneaded with commercially available 30 mm extruder (L/D=24) and subjected to hot pressing (150° C. ×10 minutes) to obtain the desired water retention material in the form of a sheet having the thickness of 1 mm.

EXAMPLES 10 to 14

A water retention material having a thickness of 1 mm was obtained according to the same manner as described in Example 9 except that the kind of the thermoplastic resin was changed as shown in Table 3 provided that regarding polyvinyl chloride, dioctyl phthalate (20 parts) was added and subjected to hot pressing (170° C. ×10 minutes).

The water-absorbency of each of the material obtained in Examples 9 to 14 is shown in Table 3.

sold by OUCHI Shinko Chemical Industrial Co., Ltd., Japan, under the trade name of Nocceler DM) (0.7 part) by using an open roll mill and then subjected to vulcanization with hot press (150° C. ×30 minutes) to obtain the desired water retention material in the form of a sheet having the thickness of 2 mm.

EXAMPLE 16

According to the same manner as described in Example 15, a water retention material in the form of a sheet having the thickness of 2 mm was obtained except that the water-absorbent resin was changed to untreated AQUA KEEP 4S in Preparation 1 and ethylene glycol diglycidyl ether (0.5 parts) was added.

EXAMPLE 17

The water-absorbent resin (100 parts) obtained in Preparation 1 was kneaded with chlorosulfonated polyethylene (100 parts) (manufactured and sold by Syowa Neoprene Co., Ltd., Japan, under the trade name of Hypalon 40), water (50 parts), stearic acid (2 parts), magnesium oxide (20 parts) (manufactured and sold by Sankoo Kasei Co., Ltd., Japan, under the trade name of Kyowa Mag 150), vulcanization accelerator (2 parts) (manufactured and sold by OUCHI Shinko Chemical

TABLE 3

| | | Water-absorbency | | | |
|---|---|---|---|---|---|
| Ex. No. | Thermoplastic resin | Amount (Parts) | Water absorption rate (%, 48 hrs) | Removal ratio (%, 48 hrs.) | Surface appearance (after 48 hrs soaking) |
| Ex. 9 | ethylene-acrylic acid copolymer (YUKALON EAA A-150 manufactured by MITSUBISHI PETROCHEMICAL Co., Ltd.) | 100 | 590 | <1 | A |
| Ex. 10 | polyethylene (Flo-thene G 801 manufactured by SEITETSU KAGAKU Co., Ltd.) | 100 | 580 | " | A |
| Ex. 11 | polyester (Polyest-KF 710 manufactured by The Nippon Synthetic Chemical Co., Ltd.) | 100 | 680 | " | A |
| Ex. 12 | nylon (AMILAN 842 manufactured by Toray Industries Co., Ltd.) | 100 | 450 | " | A |
| Ex. 13 | polyvinyl chloride (compound for cable manufactured by Plus Tech Corp.) | 100 | 700 | " | A |
| Ex. 13 | ethylene-vinyl acetate copolymer (Sumitate R 5011 manufactured by SUMITOMO Chemical Co., Ltd.) | 100 | 1500 | " | A |

EXAMPLE 15

The water-absorbent resin (100 parts) obtained in Preparation 1 was kneaded with stylene-butadiene rubber (137.5 parts) (manufactured and sold by NIPPON ZEON Co., Ltd., Japan, under the trade name of Nipol 1778J), carbon black (20 parts) (High Abrasion Furnace), water (50 parts), atactic polypropylene (100 parts) (manufactured and sold by MITSUBISHI PETROCHEMICAL Co., Ltd., Japan, under the trade name of YUKATAC), diatomaceous earth (50 parts), zinc oxide (3 parts), stearic acid (2 parts), sulfur (4 parts), vulcanization accelerator (manufactured and sold by OUCHI Shinko Chemical Industrial Co., Ltd., Japan, under the trade name of Nocceler TT) (1.75 parts) and vulcanization accelerator (manufactured and Industrial Co., Ltd., Japan, under the trade name of Nocceler TRA) and vulcanization accelerator (0.5 parts) (manufactured and sold by OUCHI Shinko Chemical Industrial Co., Ltd., Japan, under the trade name of Nocceler DM) by using 6 inch open roll mill and subjected to hot pressing (150° C. ×30 minutes) to obtain the desired water retention material in the shape of a sheet having the thickness of 2 mm.

EXAMPLE 18

The water-absorbent resin (100 parts) obtained in Preparation 1 was kneaded with natural rubber (Pale Crepe No. 2) (100 parts), zinc oxide (5 parts), antioxidant age resistor (1 part) (manufactured and sold by OUCHI Shinko Chemical Industrial Co., Ltd., Japan, under the trade name of NOCRAC NS-6, calcium carbonate (25 parts), Carbon SRF (5 parts) (manufactured and sold by ASAHI CARBON Co., Ltd., Japan, under the trade name of #50), process oil (15 parts) (manufactured and sold by San Petrochemical Co., Ltd., Japan, under the trade name of Aroma 790), stearic acid (10 parts), sulfur (3.5 parts), accelerator (0.2 part) and sodium bicarbonate (10 parts) by using 6 inch open roll mill. Then, the mixture was expanded by subjecting to hot pressing to obtain the desired spongy water retention material having the specific gravity of 0.35.

EXAMPLE 19

To a mixture of the water-absorbent resin (100 parts by weight) obtained in Preparation 1, a main component (167 parts) (manufactured and sold by SHINETSU Chemical Co., Ltd., Japan, under the trade name of KE51) and silicone oil (16.7 parts) (manufactured and sold by Wacker Chemie GmbH, West Germany, under the trade name of WM-100) was added a curing agent (6.7 parts) (manufactured and sold by SHINETSU Chemical Co., Ltd., Japan, under the trade name of CAT-RS) with stirring uniformly. The mixture was cast in 90 φ glass Petri dish to obtain the desired spongy water retention material having the specific gravity of 0.25.

EXAMPLE 20

The water-absorbent resin (100 parts) obtained in Preparation 1 was mixed with urethane precopolymer (400 parts) (manufactured and sold by DAI NIPPON INK Chemicals Inc., Japan, under the trade name of PANDEX-E). After preheating to 80 to 100° C., a curing agent (28 parts) (manufactured and sold by DAI NIPPON INK Chemicals Inc., Japan, under the trade name of PANDEX-E) molten at 120° C. was added. The mixture was cast in a mold and cured in a constant temperature bath (120° C.×40 minutes) to obtain the desired spongy water retention material.

COMPARATIVE EXAMPLES 6 TO 10

According to the same manner as described in Examples 15 and 17 to 20, a water retention material was obtained except that the water absorption capacity of the water-absorbent resin used was not adjusted.

Comparative Example 6 is also corresponding to the product of Example 16 which does not contain ethylene glycol diglycidyl ether.

The results of Examples 15 to 20 and Comparative Examples 6 to 10 are shown in Table 4.

TABLE 4

| Ex. No. | Elastomer | Water-absorbency | | |
|---|---|---|---|---|
| | | Water absorption rate (%, 48 hrs) | Removal ratio (%, 48 hrs.) | Surface appearance (after 48 hrs soaking) |
| Ex. 15 | styrene-butadiene rubber | 450 | <1 | A |
| Ex. 16 | styrene-butadiene rubber | 450 | " | A |
| Ex. 17 | chlorosulfonated polyethylene | 600 | " | A |
| Ex. 18 | natural rubber | 650 | " | A |
| Ex. 19 | silicone rubber | 950 | " | A |
| Ex. 20 | urethane rubber | 1000 | " | A |
| Comp. Ex. 6 | styrene-butadiene rubber | 500 | 8 | B |
| Comp. Ex. 7 | chlorosulfonated polyethylene | 750 | 10 | B |
| Comp. Ex. 8 | natural rubber | 450 | 22 | B |
| Comp. Ex. 9 | silicone rubber | 200 | 24 | C |
| Comp. Ex. 10 | urethane rubber | 450 | 21 | B |

EXAMPLE 21

The water-absorbent resin (100 parts) obtained in Preparation 1 was kneaded with moisture curing one-component type silicone sealant (non-solvent type, 200 parts) (manufactured and sold by SHINETSU Chemical Co., Ltd., Japan, under the trade name of KE45, deoxime type), plasticizing agent (10 parts) (manufactured and sold by Wacker Chemie GmbH, West Germany, under the trade name of WM-100) ad crosslinking agent (2 parts) (manufactured and sold by Wacker Chemie GmbH, West Germany, under the trade name of BO-38) by using 5 liter-planetary mixer to produce the desired water retention material in the shape of a sheet having the thickness of 4 mm. Further, the kneaded mixture was filled in an aluminum tube to evaluate storage stability.

EXAMPLES 22 TO 24

According to the same manner as described in Example 21, a sheet having the thickness of 4 mm and a kneaded product filled in a tube were obtained except that the kind of one-component type sealant was changed.

COMPARATIVE EXAMPLES 11 to 14

According to the same manner as described in Example 21, a sheet having the thickness of 4 mm and a kneaded product filled in a tube were obtained by using 100 parts of AQUA KEEP 4S (water content: 6.5%, water absorption capacity: 300 g/g) and changing the kind of one-component type sealant.

The results of Examples 21 to 24 and Comparative Examples 11 to 14 are shown in Table 5. Storage stability was evaluated at 30° C. according to the criteria whether the contents are smoothly squeezed out from the tube or not.

TABLE 5

| Ex. No. | Sealant | Water-absorbency | | Storage stability | |
|---|---|---|---|---|---|
| | | Absorption rate (%, after 7 days) | Removal ratio (%, after 7 days) | Surface appearance (after 7 days soaking) | (30° C.) |
| Ex. 21 | silicone sealant KE-45 (manufactured by SHINETSU Chemical Co., Ltd.) | 130 | <1 | A | >6 months |
| Ex. 22 | modified silicone sealant Sharpie-Seal M (manufactured | 250 | " | A | >6 months |

TABLE 5-continued

| Ex. No. | Sealant | Water-absorbency | | Storage stability | |
|---|---|---|---|---|---|
| | | Absorption rate (%, after 7 days) | Removal ratio (%, after 7 days) | Surface appearance (after 7 days soaking) | (30° C.) |
| Ex. 23 | by Sharp Chemical Co., Ltd.) polyurethane sealant Bond Urethane Caulk (manufactured by KONISHI Co., Ltd. | 700 | " | A | >6 months |
| Ex. 24 | polysulfide sealant Topkol (manufactured by Toray-Thiokol Co., Ltd.) | 1200 | " | A | >6 months |
| Comp. Ex. 11 | silicone (KE-45) | 150 | 6 | B | cured after 3 days |
| Comp. Ex. 12 | modified silicone (Sharpie-Seal M) | 280 | 7 | B | cured after 7 days |
| Comp. Ex. 13 | polyurethane (Bond Urethane Caulk) | 750 | 11 | B | cured after 30 days |
| Comp. Ex. 14 | polysulfide (Topkol S) | 1500 | 21 | C | cured after 3 months |

EXAMPLE 25

According to the same manner as described in Example 21, the water-absorbent resin (100 parts) obtained in Preparation 1 was kneaded with moisture curing one-component solvent type silicone sealant (400 parts) (manufactured and sold by SHINETSU Chemical Co., Ltd., Japan, under the trade name of KE-45S) and crosslinking agent (1 part) (manufactured and sold by Wacker Chemie GmbH, West Germany, under the trade name of BO-38) under normal pressure to obtain the desired water retention material in the shape of a sheet having the thickness of 4 mm.

EXAMPLE 26

The water-absorbent resin (100 parts) obtained in Preparation 1 was added to the main component of two-component type polyurethane sealant (40 parts) (manufactured and sold by KONISHI Co., Ltd., Japan, under the trade name of Bond U Seal) and the mixture was admixed with the predetermined amount of the curing agent. The resulting composition was cast in a mold to obtain the desired water retention material in the shape of a sheet having the thickness of 4 mm.

The results of Examples 25 and 26 are shown in Table 6.

TABLE 6

| Ex. No. | Sealant | Water-absorbency | | Storage stability | |
|---|---|---|---|---|---|
| | | Water absorption rate (%, after 7 days) | Removal ratio (%, after 7 days) | Surface appearance (after 7 days soaking) | (30° C.) |
| Ex. 25 | solvent type silicone sealant KE-45S (manufactured by SHINETSU Chemical Co., Ltd.) | 130 | <0 | A | >6 months |
| Ex. 26 | two component system polyurethane sealant Bond U Seal (manufactured by KONISHI Co., Ltd | 450 | <0 | A | >6 months |

EXAMPLE 27

The water retention material obtained in Example 1 was dissolved in tetrahydrofuran. The solution was applied on an aluminum plate and dried to obtain the desired water retention material having the coating thickness of 40μ.

EXAMPLE 28

The unvulcanized roll-kneaded product obtained in Example 17 was dissolved in toluene. The solution was applied on an aluminum plate and dried to obtain the desired water retention material having the coating thickness of 100μ.

EXAMPLE 29

To the water-absorbent resin obtained in Preparation 1 whose water absorption capacity was adjusted to 25 fold (100 parts, 2.2 g) were added a commercially available chloroprene adhesive having 30% of solids content and 20% of rubber content (2,000 parts, 42.8 g) (manufactured and sold by NICHIRIN Rubber Co., Ltd., Japan, under the trade name of Ad Bond #50) and toluene (2,567 parts, 55.0 g). The mixture (100 g) was filled in a 200 cc glass bottle together with glass beads (3 φ, 50 g) and mixed with shaking by a paint shaker for about 4 hours. The resulting solution was applied on an aluminum plate and dried to obtain the desired water retention material having the coating thickness of 15μ.

EXAMPLE 30

To the water-absorbent resin (100 parts, 1.7 g) obtained in Preparation 1 were added commercially available Hypalon paint (2,667 parts, 44.7 g) (manufactured and sold by NISSHIN KOGYO Co., Ltd., Japan, under the trade name of Osole F-4 , white color) and xylene (3,198 parts, 53.5 g). The mixture (100 g) was filled in a 200 cc glass bottle together with glass beads (3 φ, 50 g). The mixture was blended with shaking by a paint shaker for about 4 hours. The resulting solution was applied on a polyester film (85μ) and dried to obtain the water retention material having the coating thickness of 15μ.

EXAMPLE 31

The water-absorbent resin (100 parts) obtained in Preparation 1 was kneaded with Hypalon 20 (200 parts)

(manufactured and sold by SHOWA Neoprene Co., Ltd., Japan), tribasic lead maleate (80 parts), phthalic acid (4 parts), rutile titanium dioxide (3 parts) and Nocceler-TET (3 parts) (manufactured and sold by OUCHI Shinko Chemical Industrial Co., Ltd., Japan) by using an open roll mill. The kneaded product was dissolved in hydrogenated wood rosin (6 parts), toluen (992 parts) and butanol (248 parts). The resulting solution was applied on a polyester film (85μ) to obtain a water retention material having a coating thickness of 70μ.

COMPARATIVE EXAMPLES 15 TO 19

According to the same manner as described in Examples 27 to 31, a coating film was obtained by using AQUA KEEP 4S.

The results of Examples 27 to 31 and Comparative Examples 15 to 19 are shown in Table 7.

TABLE 7

| Ex. No. | Water retention material film (thickness) | Water-absorbency after 1 day | after 7 days | after 14 days | Surface appearance |
| --- | --- | --- | --- | --- | --- |
| Ex. 27 | ethylene-vinyl acetate copolymer (40μ) | 600 | 600 | 600 | A |
| Ex. 28 | stylene-butadiene rubber (100μ) | 470 | 490 | 490 | A |
| Ex. 29 | chloroprene adhesive (15μ) | 140 | 145 | 145 | A |
| Ex. 30 | Hypalon paint (15μ) | 80 | 80 | 80 | A |
| Ex. 31 | Hypalon paint (70μ) | 95 | 95 | 90 | A |
| Comp. Ex. 15 | ethylene-vinyl acetate copolymer (40μ) | 650 | 600 | 550 | B |
| Comp. Ex. 16 | stylene-butadiene rubber (100μ) | 600 | 530 | 400 | B |
| Comp. Ex. 17 | chloroprene adhesive (15μ) | 150 | 100 | 80 | B |
| Comp. Ex. 18 | Hypalon paint (15μ) | 90 | 80 | 50 | B |
| Comp. Ex. 19 | Hypalon paint (70μ) | 100 | 75 | 45 | C |

What is claimed is:

1. A method for providing an elastomer with water retention properties and water-absorbency comprising mixing the elastomer with finely divided particles of water-absorbent resin having a particle size of 100μ or finer whose water absorption capacity is not adjusted, in the presence of 10 to 200 parts by weight of water per 100 parts by weight of the said resin and a cross linking agent in an amount of 0.01 to 10 parts by weight per 100 parts by weight of the said resin.

2. The method according to claim 1, further comprising molding the mixture resulting from said mixing.

* * * * *